Patented Aug. 8, 1950

2,517,708

UNITED STATES PATENT OFFICE 2,517,708

MAKING DISUBSTITUTED ACETIC ACIDS FROM 2 - (SATURATED HYDROCARBON SUBSTITUTED) CYCLOHEXANOLS

Earl L. Pelton and Andrew A. Holzschuh, Midland, Mich., assignors to The Dow Chemical Company, Midland, Mich., a corporation of Delaware No Drawing. Application January 3, 1949, Serial No. 69,037

7 Claims. (Cl. 260—531)

This invention relates to a method for the preparation of di-(saturated hydrocarbon) substituted acetic acids, and especially the α-(saturated hydrocarbon substituted) caproic acids from 2-(saturated hydrocarbon substituted) cyclohexanols, and to certain new compounds so produced.

One of us has described, in U. S. Patent 1,961,623, the reaction of cyclohexanol with an excess of a fused alkali metal hydroxide to produce a mixture of acids, one of which has the empirical formula $C_{12}H_{20}O_2$. Later work has shown this acid to be 2-cyclohexene-1-caproic acid. It has been proven that the production of 2-cyclohexene-1-caproic acid by the caustic fusion and oxidation of cyclohexanol requires the existence of an intermediate condensate, 2-(2-cyclohexene) cyclohexanol, so that the reaction proceeds as follows, with the point of oxidative scission being indicated by a dotted line:

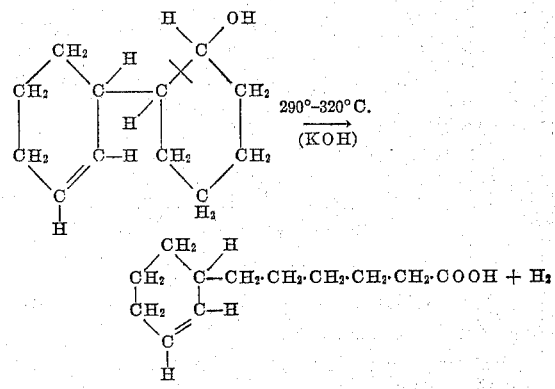

We have now found that the point of scission in the saturated, analogous compound, 2-cyclohexane cyclohexanol, and in 2-(saturated hydrocarbon substituted) cyclohexanols generally, is not the same as that shown in the foregoing equation, and that, instead of forming the expected cyclohexane caproic acid or analogous hydrocarbon caproic acids when 2-(saturated hydrocarbon substituted) cyclohexanols are fused with an excess of caustic alkali, there are produced as principal products α-cyclohexane caproic acid or the analogous α-(saturated hydrocarbon substituted) caproic acid. The reaction is set forth in the following equation, with the point of oxidative scission being indicated again by a dotted line. The symbol R represents a saturated hydrocarbon radical.

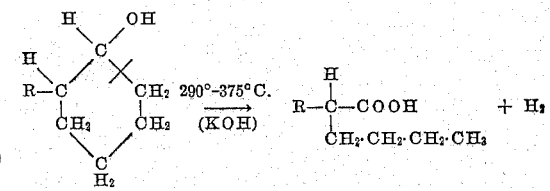

The products are seen to be di-(saturated hydrocarbon) substituted acetic acids.

The following examples illustrate the practice of the invention.

Example 1

630 grams (10 moles) of 90 per cent potassium hydroxide as mixed with 100 grams (1 mole) of potassium acetate to lower the viscosity of the mixture when molten, and the mixture was placed in a nickel pot 6 inches in diameter and 10 inches deep. The pot was provided with a stirrer and a cover having an inlet for liquid feed and a vapor outlet connected with a condenser. The pot was heated to 350° C. and the stirrer was set in motion. In the course of 6 hours, there was introduced dropwise into the fused alkali about 1800 grams (9.88 moles) of 2-cyclohexane cyclohexanol. One-half hour after the cyclohexyl cyclohexanol had all been added, heating and stirring were discontinued and the reaction mixture was cooled, then dissolved in water and acidified with hydrochloric acid. The organic layer was separated from the resulting brine, and the organic acid product was distilled. The main product was not the anticipated cyclohexane caproic acid whose melting point is known to be 32°–33° C., nor was it 2-cyclohexene-1-caproic acid, freezing at —11° C., but was, instead, a colorless oil boiling at 167° to 172° C. at 10 millimeters, absolute pressure. This acid had a neutralization equivalent of 196.2 and did not freeze or crystallize at temperatures down to —20° C. It was a saturated product, as shown by its failure to absorb bromine. The acid readily formed an amide melting at 177.8° to 178.3° C., and an ethyl ester boiling about 130°–135° C. at 10 millimeters. Since these properties resemble those of the cyclohexyl butyl acetic acid (α-cyclohexane caproic acid) reported by von Braun and Kurtz, Ber. deutsch. chem. Gesell. 70, 1224–29 (1937), some of their reported acid was synthesized from malonic ester. The so-formed α-cyclohexane caproic acid was converted to the corresponding amide which melted at 178.7° to 179.6° C. A mixture of the amides from the two sources melted at 178° to 178.9° C., showing that the product obtained from the caustic fusion is α-cyclohexane caproic acid. The dialkylamino ethanol ester of this acid has given indication of utility as an antihistaminic. The free acid also forms useful high-boiling esters.

It is apparent that the present, one-step process for producing α-cyclohexane caproic acid in yields of 50 to 80 per cent in a few hours is preferable to the old process which involved the successive preparations of diethyl malonate, its sodium reaction product, cyclohexyl diethyl malonate, its sodium reaction product, cyclohexyl butyl diethyl malonate, cyclohexyl butyl malonic acid, and finally cyclohexyl butyl acetic acid (α-cyclohexane caproic acid), since the old synthesis is tedious, expensive, and gives low over-all yields.

*Example 2*

In a similar manner, 30 pounds of potassium hydroxide and 30 pounds of sodium acetate were mixed and fused at a temperature of 350° C. in an iron kettle 2 feet in diameter and 3 feet deep, fitted with an effective stirrer. 2-secondary-butyl cyclohexanol was introduced through a feed pipe passing through the tight-fitting cover of the kettle at such a rate that 29¾ pounds had been consumed in 10 hours. The reaction mass was cooled, dissolved in water and acidified, and 28 pounds of an acidic organic oil was recovered. This oil was distilled and gave a 40 per cent yield of α-secondarybutyl caproic acid, boiling at 135° C. under 10 millimeters and at 158° C. at 30 millimeters of mercury, absolute pressure. This compound has a density (25°/4° C.) of 0.9060 and a refractive index (25°/D) of 1.4342. It forms an amide melting at 114.9–115.2° C. There was also obtained a 29 per cent yield of α-secondarybutyl cyclohexanebutyric acid, boiling at about 169° C. at 10 millimeters pressure.

*Example 3*

In the same apparatus and under the same conditions described in Example 2, 38 pounds of 2-isopropyl cyclohexanol formed 35 per cent of the theoretical yield of α-isopropyl caproic acid, boiling at 109° C. at 5 millimeters pressure and at 125° C. at 10 millimeters pressure. This new compound has a density (25°/4° C.) of 0.9017 and a refractive index (25°/D) of 1.4270. It forms an amide melting at 123°–123.3° C. There was also obtained 13 per cent of 2-isopropyl cyclohexanebutyric acid and 15 per cent of α,2-di-isopropyl cyclohexene caproic acid.

The alkali metal hydroxide used in the present reaction may be the potassium hydroxide-acetate mixtures of the various examples, or it may be potassium or sodium hydroxide alone, or mixtures of these hydroxides, as disclosed, for example, in a prior Pelton Patent 1,961,623, or in Grether and Pelton Patent 2,010,692, or in Pelton and Holzschuh Patent 2,425,343. The preferred temperatures of reaction for the present process are from 290° to 375° C., though any temperature which causes scission of the cyclohexanol nucleus may be used. Temperatures below 290° C. are usually not satisfactory.

The α-(saturated hydrocarbon substituted) caproic acids made by the present method are useful as intermediates in the preparation of antihistaminics, antispasmodics, germicides and other pharmaceuticals, as well as in the preparation of new and useful high boiling esters.

We claim:

1. The method for the production of α-(saturated hydrocarbon substituted) caproic acids which consists essentially in heating a 2-(saturated hydrocarbon substituted) cyclohexanol with a fused alkali metal hydroxide at a temperature in the range from 290° to 375° C.

2. The method for the production of α-alkyl caproic acids which consists essentially in heating a 2-alkyl cyclohexanol with a fused alkali metal hydroxide at a temperature in the range from 290° to 375° C.

3. The method for the production of α-cyclohexane caproic acid which consists essentially in heating 2-cyclohexane cyclohexanol with a fused alkali metal hydroxide at a temperature in the range from 290° to 375° C.

4. The method for the production of α-cyclohexane caproic acid which consists essentially in heating 2-cyclohexane cyclohexanol with fused potassium hydroxide at a temperature in the range from 290° to 375° C.

5. The method for the production of α-cyclohexane caproic acid which consists essentially in heating 2-cyclohexane cyclohexanol with a fused mixture of about 10 moles of potassium hydroxide for each mole of potassium acetate, at a temperature in the range from 290° to 375° C.

6. The method for the production of α-secondarybutyl caproic acid which consists essentially in heating α-secondarybutyl cyclohexanol with a fused alkali metal hydroxide at a temperature in the range from 290° to 375° C.

7. The method for the production of α-isopropyl caproic acid which consists essentially in heating 2-isopropyl cyclohexanol with a fused alkali metal hydroxide at a temperature in the range from 290° to 375° C.

EARL L. PELTON.
ANDREW A. HOLZSCHUH.

REFERENCES CITED

The following references are of record in the file of this patent:

Fischer et al: Ber. Deut. Chem., vol. 45, pp. 250–253 (1912).

Sommaire: Beilstein (Handbuch, 4th ed.), vol. 2, 2nd suppl., page 308 (1942).

I. G. Farben: Beilstein (Handbuch, 4th ed.), vol. 2, 2nd suppl., page 313 (1942).